United States Patent [19]

Wardall

[11] Patent Number: 5,020,833
[45] Date of Patent: Jun. 4, 1991

[54] ACCESSORY TOOL FOR ANGLERS

[76] Inventor: Thad E. Wardall, 1020 W. Lk. Sammamish NE., Bellevue, Wash. 98008

[21] Appl. No.: 489,347
[22] Filed: Mar. 6, 1990
[51] Int. Cl.$^5$ ................................................ D03J 3/00
[52] U.S. Cl. ............................................ 289/17; 289/2
[58] Field of Search ..................... 289/2, 17, 18.1, 13

[56] References Cited

U.S. PATENT DOCUMENTS

| | | | |
|---|---|---|---|
| 2,469,037 | 5/1949 | Harvey | 289/17 |
| 2,488,414 | 11/1949 | King | 289/17 |
| 2,646,298 | 7/1953 | Leary | 289/17 |
| 2,716,036 | 8/1955 | Fenell | 289/17 |
| 2,825,592 | 3/1958 | Semple | 289/17 |
| 2,926,036 | 2/1960 | Wimberley | 289/17 |
| 3,406,994 | 10/1968 | Duncker et al. | 289/2 |
| 3,521,918 | 7/1970 | Hammond | 289/17 |
| 3,713,680 | 1/1973 | Pagano | 289/17 |
| 3,756,638 | 9/1973 | Stockberger | 289/17 |
| 3,787,081 | 1/1974 | Macy | 289/17 |
| 4,029,346 | 6/1977 | Browning | 289/17 |
| 4,510,653 | 4/1985 | Semanko | 289/17 |

FOREIGN PATENT DOCUMENTS 390643 10/1908 France ................... 289/17

Primary Examiner—Werner H. Schroeder
Assistant Examiner—Michael A. Neas
Attorney, Agent, or Firm—Robert W. Jenny; Charles F. Gunderson

[57] ABSTRACT

The accessory tool for anglers comprises two class 1 levers and a fulcrum between them. The levers are flat and rectangular, approximately twice as long as they are wide. They are pivoted on opposite sides of the fulcrum by stubs extending from the fulcrum through mating holes in the levers and held in place by an elastic band which also serves as a resilient element which biases one set of ends of the levers together. These ends are of uneven length so that one end rests against the other to form a pincer for holding ends of lines, leaders or the like. There are two hooks, one on each of these ends, which form an opening when the apparatus is at rest and the pincer closed. When the other ends are pressed together the tips of the hooks part, forming a gap in the opening and the pincer is opened.

The other set of ends have leather pads on the inner surfaces of the ends, the pads serving as leader straighteners when a leader is placed between them, the ends are pressed together and the leader to be straightened is drawn between the pads. A cutting edge is installed along the end of one of this set of ends and its sharp edge abuts the inside surface of the other end, thus forming a cutter. Other accessories, not part of the invention, may be appended to the apparatus.

3 Claims, 1 Drawing Sheet

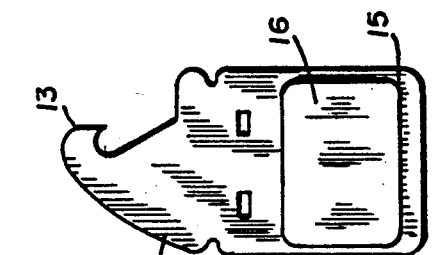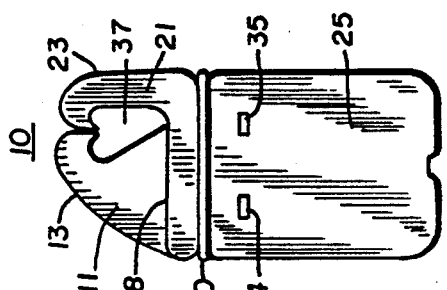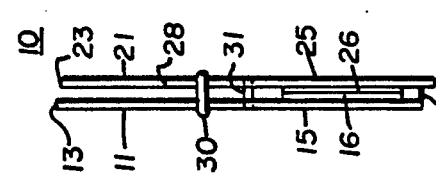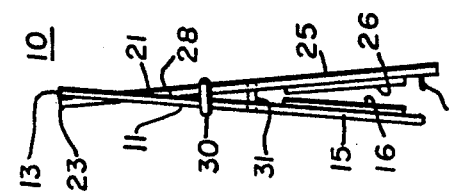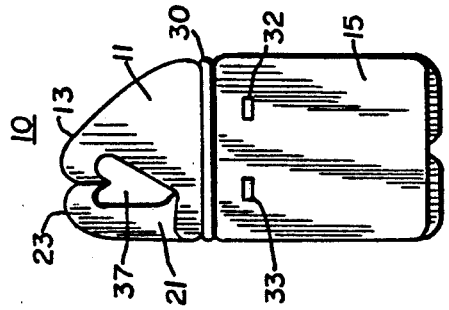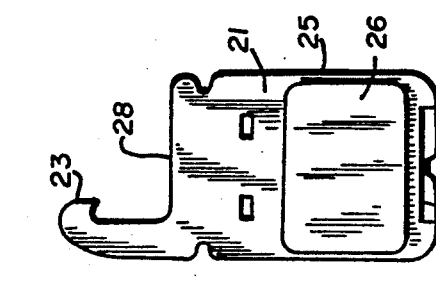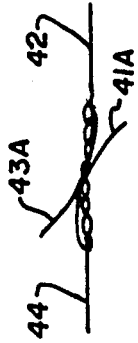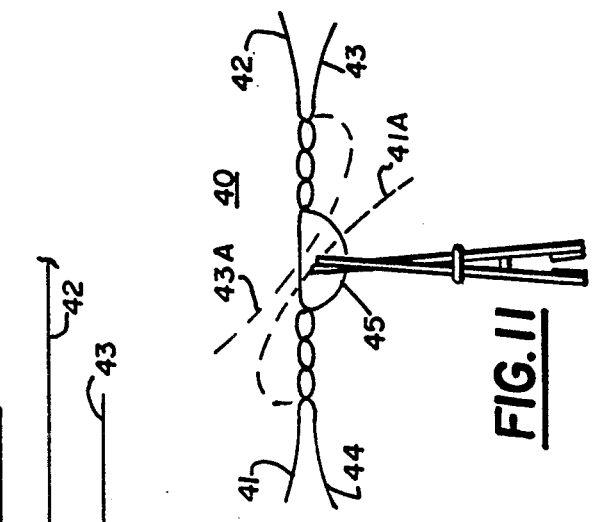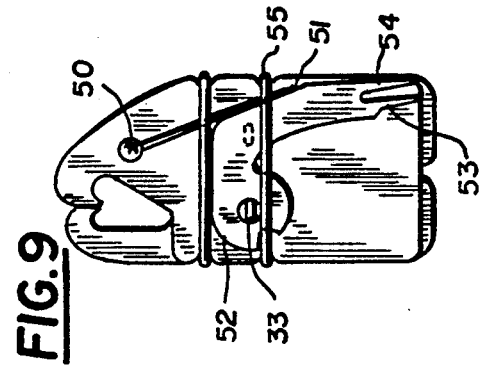

ACCESSORY TOOL FOR ANGLERS

BACKGROUND OF THE INVENTION

Angling is an unique sport. It requires a very special delicacy and skill; knowledge of the habits of the game fish; and infinite patience. It is unusual in that it takes a fisherman out into nature, quiet and alone, to practice his art.

However, it does take the angler out into his streams, often far from a home base or source of supply, and he must be able to carry and handle his equipment, and perform certain tasks, without help, and often under difficult field conditions. In addition to his rod and reel, etc., he must carry certain well-chosen flies with hooks and leaders to catch his fish, and he must have certain tools for repairing lines; cutting and tying lines securely, and attaching different flies to his lines.

The cutting and tying of the lines can be a particularly difficult chore. Actually the knots used, and most effective for fishing lines are relatively complex. They must be very compact, and leave the ends in an axial direction to pass through the rod guides. In a warm and well lit workshop, it is relatively easy to tie even the most difficult of knots, and skilled and expert knot tyers can tie them under almost any conditions.

However, one must picture the angler cold, wet, and tired. Fingers may be getting numb, the light is poor, and the fine monofilament lines are almost invisible. In certain people there may be a touch of arthritis or other digital handicap. He may be far from shelter, light, and warmth, and the two lines must be tied together. A simple mechanism to assist in tying a knot, or performing any of several simple functions could be invaluable.

There are, of course, numerous accessory tools on the market intended to aid anglers in the various activities and operations related to sport fishing. Few of these products, however, attempt to combine more than one or two functions into the same device for convenient access and easier use. Some of these necessary tools can be heavy as well as bulky, and some not quite as simple and efective as they sound.

A typical fly angler, for example, would normally carry a set of clippers for cutting lines and leaders, a sharpening stone or file for honing the points of fish hooks, a needle or pick for clearing the eyes of fish hooks, or untying knots, and, possibly, a piece of leather or rubber for straightening monofilament lines, leaders, and tippets. These tools are all in addition to a normal compliment of flies, fishing rod, reels, and other support equipment.

Seemingly, all anglers suffer from this profusion of single-purpose gadgets, and the problems of how and where to store and carry them when not in use. Moreover, while practically every angler employs the use of knots for connecting lines to lines and lines to hooks, there are only a few products on the market intended to assist the angler in tying the basic knots commonly used in fishing. Again, these are single-purpose tools intended for tying specific knots. They have to be carried separately, and found when needed. also, they are sold only through specialty sport shops and mail order companies, and are expensive and difficult to obtain.

It is therefore an object of this invention to provide a simple, small, light, versatile device that can replace several of the single-purpose products currently being sold, that may be needed by the fisherman at almost any time or place.

SUMMARY OF THE INVENTION

A multipurpose device for assisting a fisherman in the working on his lines consists, basically, in two opposing flat levers, with a pivotal fulcrum, separating the two, near the center. For purposes of this disclosure and the attached claims, the tool is described as if positioned with its long dimension vertical and thereby it has upper portions, a top and top ends of its components and a bottom, a lower portion and bottom ends of its components as well as middle portions. The upper end of one lever projects upward, and bends inwardly toward the center to form a hook. The upper end of the other lever also extends upward, and bends inwardly to meet the opposing hook. The opposing hooks form an opening between the upper ends. At least one lever forms a flat ridge to rest against the surface of the other lever. A spring of any type above the fulcrum holds the flat ridge against the surface of the other lever and the ends of the hooks closed together. The inner surfaces of the levers, below the fulcrum, are faced with leather-like pads to help straighten lines and leaders when the lower portions of the levers are pushed together and a line or leader drawn between them. A cutting edge is secured to the bottom of the inside of one of the levers to fit against the bottom of the other lever to act as a cutter when the lower portions of the levers are pushed together at which time the upper hooks are spread apart to attach to a line, and the flat ridge is separated from the surface of the other lever to release or fit in a piece of line. Pins and other small, functional devices may be attached to either lever.

A key feature which specifically enhances the utility of the subject device is that the tying, cutting and straightening functions are all activated by holding the lower ends of the levers between thumb and forefinger and pressing on those ends. Use of the tool requires a comparative minimum of grip shifting and finger dexterity.

BRIEF DESCRIPTION OF THE DRAWINGS

FIG. 1 shows a side view of the device closed;
FIG. 2 shows a side view of the device open;
FIG. 3 shows a front view of one side of the device;
FIG. 4 shows a front view of the other side;
FIG. 5 shows an inside view of the other side;
FIG. 6 shows an inside view of the one side;
FIG. 7 shows a top view of a fulcrum for the device;
FIG. 8 shows a side view of the fulcrum;
FIG. 9 shows a front view of the one side of the device with attachments for other functions;
FIG. 10 shows a side view of the device in operation;
FIG. 11 shows the operation completed; and
FIG. 12 shows a completed knot.

DETAILED DESCRIPTION OF THE DRAWINGS

Referring now more particularly to FIG. 1, a side view of the tool for anglers is shown in its closed position. Here the two levers 11 and 21 are seen with their two ends 13 and 23 overlapping, only the one end 13 being visible from this direction. FIG. 1 also shows a rubber band, 30 holding 11 and 21 together; a fulcrum 31, separating the two; the lower portions 15 and 25; and the leather pads 16 and 26, respectively, of the levers.

FIG. 1 also shows a cutter 27 secured to and extending from the bottom of the lever 21. This will engage the opposing bottom of the lever 11 when the bottoms of the levers are pressed, together as seen in FIG. 2.

FIG. 2 shows a side view of the same device in its open position. Here, as in all of the rest of the figures, similar elements are similarly numbered. Here, the depressing of the lower portions 15 and 25 opens the top of the device to separate the hooks 13 and 23, for easier insertion of a fishing line to assist in tying one of the knots. Pressing the portions 15 and 25, also separates an edge 28, seen in figures 4 and 5 from the inner surface of the lever 11. It also holds together the leather pads 16 and 26, and forces the edge of the cutter 27 against the inside of the bottom of lever 15 for cutting lines. The value of these four functions will be described later.

FIG. 3 is a face view of the device 10 from the outside of the level 11. This shows, more clearly, a typical shape of lever 11. Here the hooked, half jaw 13 is seen butting against the opposing upper, hooked, half jaw 23 of lever 21, forming the opening 37. This also shows the positions of the rubber band 30, with respect to the fulcrum held in place by the pins 32 and 33, and with respect to the lower portion 15 of lever 11 that is used in the operation of this device.

FIG. 4 is a face view of the device 10 from the outside of lever 21. This also shows the juncture of the upper hooked half jaws 13 and 23, and the opening 37. This also shows the position of the rubber band 30, the holes for seating the pins 34 and 35 of the fulcrum, and the surface of 25, opposing that of 15, for operating this device. Most important, this figure shows the ridge 28 that is held against the inner surface of lever 11 by the rubber band 30. This ridge can hold one or more ends of a line in a given place to help in the knot tying process.

FIG. 5 shows a face view of the inside of lever 21 alone. Here the upper, hooked, half jaw 23 is seen, along with the slots for the fulcrum pins; The leather pad 26 is also seen on the inner surface of side 25 of lever. The cutter blade 27 is at the bottom of lever 25.

FIG. 6 shows a face view of the inside of lever 11 alone. This clearly shows the upper, hooked, half of the jaw of lever 11, as well as the slots for the fulcrum pins. The leather pad 16 is also seen positioned under lower portion 15.

FIGS. 7 and 8 show a top view and a side view, respectively, of a typical fulcrum 31. This has a central portion 36, that is the basic fulcrum, with projections, or pins 32 and 33 on one side to fit in the slots of plate 11, and projections 34 and 35 fit in the slots of plate 21. This is seen in FIGS. 3 and 4 respectively. The size and shape of the fulcrum can be varied to increase or decrease the motion of the upper jaws of the device, but must be coordinated with the thickness of the leather pads 16 and 26 so that they will engage evenly when lower portions 15 and 25 are pressed together.

The cutting blade 27 must also project enough to meet, or overlap slightly, the bottom of the opposite face of the other lever when the two lower portions are pressed towards each other in order to cut a fishing line or other cord cleanly. However, it must not keep the leather pads from meeting for the performance of their function. This function is, primarily, to help straighten segments of line or leader that may have become twisted or curled in storage or use. The line may be put between the two pads, which can be held tightly together, between the fingers of the fisherman, while the line is drawn between the leather pads as many times as may be needed.

The cutting blade 27 is shown on the bottom of lever 21 to engage the bottom of the lever 11. However, this could, almost obviously, be reversed. In any case, since the levers 11 and 21 would probably be of plastic, the cutting edge of 27 should not be damaged.

FIG. 9 shows a front view of this device with a few auxilliary mechanisms added to enhance the usefulness of a typical device. For instance, a pin may be added, with its head 50 and point 51 for clearing out fish hook eyes and the like. The other gadget 52, which may pivot about the elongated pin 33, can project away from the side of the device in an obvious manner, to expose the tines 53 and 54 for help in handling the lines, or tying other knots, such as the classic "nail" knot.

FIGS. 10, 11, and 12 show the sequence of steps for tying a typical "barrel knot" with the aid of this device. Here, in FIG. 10, two ends of lines to be tied together are side by side with one tab end 41 of line 42 opposing tab end 43 of line 44. The opening 37 permits the jaws 13 and 23 of the device 10 to be positioned to hand over the line 44 between the tab ends 41 and 43. The lines are then held at 41 and 44 with one hand, and at 42 and 43 with the other hand while the device 10 is twirled around 3 or 4 times to appear as in FIG. 11, with an open loop or gap 45 centered between the two ends.

The tab end 41 is passed through the gap 45 as in 41A, and the tab end 43 is passed through the gap 45 as in 43A, as shown, before the device 10 is opened and removed from the line 44. The lines 42 and 44 are then drawn tightly apart to form the "barrel knot" as seen in FIG. 12. The excess of the tab ends 41A and 43A can then be trimmed to provide a relatively-smooth, elongated knot that is quite secure, and that can pass through the eyes along a fishing pole with comparative ease.

The size and share of the parts of this device can be varied to affect certain functions of this device and more or less auxilliary devices can be added to the device, as shown in FIG. 9, for the convenience of the angler.

This device will, normally, be grasped and manipulated between thumb and index finger of one hand, so the device should be just large enough to fit comfortably there. A larger version of this device might be somewhat easier to handle, up to a point, but would become increasingly heavy and bulky to carry and store. On the other hand, a smaller version of this device could be increasingly hard to find and handle under difficult conditions.

Many variations of forms of inserts for the fulcrum — including projections from the plates themselves — may also be considered, as long as they do not impede the four specific functions of this device, as described above.

However, some of these variations, while apparently simpler in function, would require more complex molding proceedures for plastic versions, and may, or may not, be simpler or more economical than this version, which can be stamped out of flat plastic sheets. As a matter of fact, a variation of this device could be achieved with identical halves with little loss of the essential functions. A ledge, such as 28, though possibly shorter, would be available on either side, and the device would be ambidextrous and reversible.

Holes, or attachments for lanyards, could be provided at several points in this device to keep it from being lost in action. Actually, the jaws themselves can be opened to attach to any ring or fastening on the anglers jacket to secure the device and hold it readily available for its next use.

Rubber bands, of convenient size and shape are readily available for holding this device in its closed position, and permitting its opening and closing. However, there are many types of small springs, equally light and strong, that could be adapted to this device. Obviously, all of the basic criteria, from weight, to simplicity, to appearance, and, above all, cost, should be considered for most effectiveness.

While one of the most valuable features of this device is in assisting in the tying of the axial "blood knot" illustrated in FIGS. 10, 11, and 12, it is obvious that the clamping of an end of a line under the end edge 28 could assist in several other knot ties or functions.

The knot-tying appendage 52, clearly shown in FIG. 9, can pivot about the projection 33, and extend outwardly away from the plate 21, to provide a simple "nail knot" tier.

What is claimed is:

1. A device for assisting in the tying of knots, said device having a longitudinal centerline and comprising a first lever having a first surface, a second surface, a lower portion, a middle portion, an upper portion, a first side and a second side; a second lever of substantially the same size as said first lever, said second lever having a first surface, a second surface, a lower portion, a middle portion, an upper portion, a first side and a second side; fulcrum means separating said middle portions of said first and second levers, said upper portion of said first side of said first lever extending upward and toward said centerline to form a first hook having a first tip; said second side of said second lever extending up and toward said centerline to form a second hook having a second tip; resilient means for drawing said upper portions together into a first position such that said first and second tips are in contact and an opening is formed enclosed by said hooks; said device being put into a second position when said lower portions are pressed toward each other, said first and second tips being separated in said second position, thereby providing a gap in said opening;

said upper portion of said first lever having an edge which in said first position contacts said inside surface of said second lever and, in said second position is separated from said second lever, said edge being urged toward said second lever by said resilient means, whereby said edge and said inside surface of said second lever serve to secure a line betweem them in said first portion.

2. A device for assisting in the tying of knots, said device having a longitudinal centerline and comprising a first lever having a first surface, a second surface, a lower portion, a middle portion, an upper portion, a first side and a second side; a second lever of substantially the same size as said first lever, said second lever having a first surface, a second surface, a lower portion, a middle portion, an upper portion, a first side and a second side; fulcrum means separating said middle portions of said first and second levers, said upper portion of said first side of said first lever extending upward and toward said centerline to form a first hook having a first tip; said second side of said second lever extending up and toward said centerline to form a second hook having a second tip; resilient means for drawing said upper portions together into a first position such that said first and second tips are in contact and an opening is formed enclosed by said hooks; said device being put into a second position when said lower portions are pressed toward each other, said first and second tips being separated in said second position, thereby providing a gap in said opening;

said device further comprising a first pad attached to said inside surface of said first lever on said lower portion of said first lever, a second pad attached to said inside surface of said second lever on said lower portion of said second lever, whereby in said first position said pads are separated and in said second position they are pressed together and a line inserted between them can be straightened by pulling the line between said pads.

3. The device of claim 1, said device further comprising a first pad attached to said inside surface of said first lever on said lower portion of said first lever, a second pad attached to said inside surface of said second lever on said lower portion of said second lever, whereby in said first position said pads are separated and in said second position they are pressed together and a line inserted between them can be straightened by pulling the line between the pads.

* * * * *